June 5, 1945.  G. I. ZEICHNER  2,377,659
THREADING APPARATUS
Filed April 13, 1944
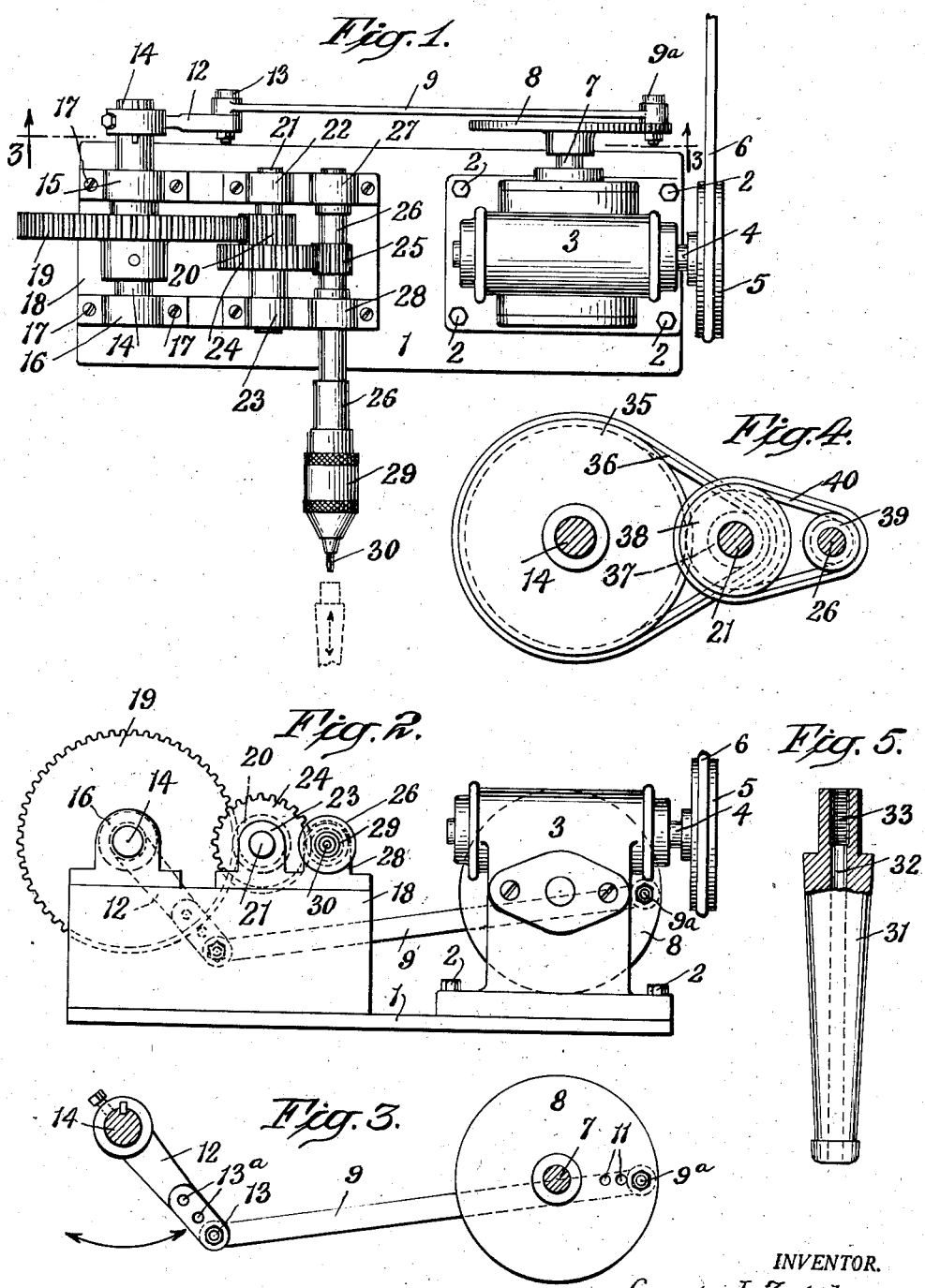
INVENTOR.
George I. Zeichner
BY
Harry Radzinsky
ATTORNEY

Patented June 5, 1945

2,377,659

UNITED STATES PATENT OFFICE 2,377,659

THREADING APPARATUS

George I. Zeichner, Brooklyn, N. Y.

Application April 13, 1944, Serial No. 530,847

4 Claims. (Cl. 10—138)

This invention relates to tapping or threading devices by means of which an aperture or recess may be speedily and accurately provided with an internal screw thread of predetermined length or number of convolutions.

The object of the invention is to provide a simple and effective apparatus of such a construction and minimum of parts as to render the mechanism reasonably portable, and which will accurately tap or thread a recess or aperture, particularly in relatively soft material, such as wood, plastics, hard rubber, and various soft metals. The invention is especially applicable for the internal threading of smokers' pipe stems and for various other purposes.

More particularly, the invention contemplates the provision of means by which a threading shaft carrying a tap or other threading tool is rotated for a predetermined number of revolutions in one direction, and then rotated for an equal number of revolutions in the opposite direction, whereby the operator need merely hold the work momentarily against the tap to result in the formation of the required thread in the aperture in the work.

The invention further contemplates the provision of a relatively simple, trouble-proof mechanism for performing the work above outlined, the mechanism being compact, light in weight, and occupying but small space.

These objects, and other objects to be hereinafter set forth, are accomplished by the invention, a particular description of which follows and is specifically pointed out in the claims appended hereto.

In the accompanying drawing, wherein an embodiment of the invention is disclosed:

Fig. 1 is a plan view of the improved threading device constructed in accordance with the invention;

Fig. 2 is a front elevation of the same;

Fig. 3 is a sectional view on the line 3—3 of Fig. 1, looking in the direction of the arrows;

Fig. 4 is a sectional view showing a belt-drive construction; and

Fig. 5 is a view of a pipe stem, illustrating the manner in which the bore of the stem may be screw-threaded by the improved mechanism.

With reference to Fig. 1, the base plate or main support for the mechanism is shown at 1, the same being secured upon a bench, or on legs, or any other suitable support. Secured thereto, as by the cap-screws 2, is a reduction gear-box 3 provided with the high-speed drive shaft 4, on which is secured the pulley 5, driven by a belt 6 from an electric motor or other suitable power source. Extending from the gear-box 3 is the low-speed shaft 7, driven at a considerably reduced speed by means of the gearing contained in the gear-box 3, and secured on said slow-speed shaft 7 is a disk 8. The gear-box and its contents may be of conventional construction.

At 9 is shown a connecting rod or pitman which has one end pivotally attached at 9a to the disk 8. It will be observed that the end of the connecting rod, secured to the disk 8, is attached thereto in a selected one of a number of holes 11 which are located on a radial line in the disk. By securement of the end of the connecting rod in a selected one of these holes, the number of revolutions in one direction made by the tapping tool can be regulated at will, as will be hereafter described.

At its opposite end, the connecting rod or pitman 9 is pivotally attached, as indicated at 13, at or near the free end of an arm 12 secured by being keyed on a shaft 14, said connection of the connecting rod to the arm 12 causing the shaft 14 to be oscillated when the disk 8 is rotated. It will be observed that the arm 12 is provided with a number of holes 13a permitting the attachment of the end of the connecting rod 9 in any one of these holes for adjustment purposes. Shaft 14 is mounted for oscillatory movement in the bearings 15 and 16, secured by the screws 17, to the top of a block or bracket 18 fastened on top of the base plate 1.

Secured on the shaft 14 is a large gear 19, in mesh with a smaller gear or pinion 20, fixed on a shaft 21, herein referred to as the "intermediate shaft," mounted for rotative movement in bearings 22 and 23 on top of the block 18. The intermediate shaft 21 also carries a gear 24 larger than the pinion 20, in mesh with a pinion 25, secured on a shaft 26, herein termed the "threading shaft," rotative in the bearings 27 and 28 secured on top of the block 18.

The threading shaft 26 is extended well beyond the bearing 28, and this extended part of the shaft is provided with a chuck 29 carrying a removable tap or threading tool 30.

The device is adapted for use in threading apertures or holes for a predetermined depth, or with a given number of threads. An example of an article expeditiously threaded by the apparatus is the pipe-stem shown at 31 in Fig. 5. The stem has the conventional bore 32 adapted to be threaded for a predetermined distance, as indicated at 33, and this is easily and quickly done by holding the bore against the end of the tap 30, which cuts a predetermined number of threads in the bore 32, and then unthreads itself due to the fact that through the mechanism described, the tap is rotated for a predetermined number of turns in one direction, and then rotated for the same number of turns in the opposite direction.

Briefly, the operation of the device is as follows:

The belt 6, driven from a motor or other suitable power source, rotates the high-speed shaft 4. Said shaft 4, through the medium of the reducing gearing contained in the gear-box (which is of conventional construction), drives slow-speed shaft 7, which rotates the disk 8. Connecting rod 9 causes the arm 12 to be oscillated, and it imparts an oscillatory movement to the shaft 14. Since shaft 14 carries the large gear 19 engaging the pinion 20, the intermediate shaft 21 is rotated for a number of turns in one direction on each swing in one direction of the arm 12, and the same number of turns in an opposite direction on the return swing of the arm 12. The intermediate shaft 21, carrying the gear 24 in mesh with the pinion 25 on the threading shaft 26, increases the number of turns made by the shaft 26. Thus, each time that arm 12 is swung in one direction, the tap 30 will be rotated for a predetermined number of turns to cut a thread of desired length in the bore 32, and each time that the arm 12 is swung in a return movement, the tap will be rotated in a reverse or unthreading direction for the same number of turns. It will thus be apparent that articles to be threaded need be merely held for a moment against the tap 30 which will cut the thread and then back out of the threaded aperture.

The apparatus is not only intended for the threading of pipe stems, as disclosed, but for many other purposes where apertures in relatively soft material are required to be threaded for a given depth in a neat, efficient and speedy manner. The construction is such that the mechanism and parts required in the device are relatively small and light, and with the exception of the source of power required, such as an electric motor, the device is easily portable and can be used to advantage in small shops and other places where but little space is available. By adjustment of the connecting rod 9 in the selected holes 11 and 13a, the number of threading and unthreading revolutions of the tap 30 can be regulated.

While I have shown in Figs. 1 to 3, inclusive, an arrangement of gearing for driving the threading shaft 26 from the shaft 7, the apparatus may be simplified and lightened in weight somewhat, if belts are used instead of the gears disclosed. This is illustrated in Fig. 4, wherein the shaft 14 is shown as being provided with a large pulley 35, around which belt 36 extends, the belt also extending about a small pulley 37 secured on the shaft 21. On shaft 21 is also secured a larger pulley 38 which drives the pulley 39 on the shaft 26 by means of the belt 40. Thus, through this arrangement of pulleys and belts, the results secured by the mechanism of Figs. 1 to 3, inclusive, are obtainable.

While I have shown several embodiments of the invention, it is obvious that the same is not to be restricted thereto, but is broad enough to cover all structures coming within the scope of the annexed claims.

What I claim is:

1. A threading device of the character described comprising, reduction gearing including a high-speed shaft, means for driving said high-speed shaft from a motor, said gearing including a low-speed shaft, a disk carried by the low-speed shaft, a connecting rod having one end connected eccentrically to the disk, a second shaft, an arm extending radially from the second shaft, the second end of the connecting rod being attached to said arm, whereby said arm is swung back and forth by rotation of the disk to produce oscillatory motion of the second shaft, a threading shaft carrying a tap, and intermediate gearing between the second shaft and the threading shaft by means of which the threading shaft is rotated at relatively high speed for a given number of complete revolutions in one direction on the swing of the arm in one direction, and is rotated for the same number of complete revolutions in a reverse direction on the return swing of the arm.

2. A threading device of the character described comprising, a drive shaft, a disk secured on said shaft, a connecting rod pivotally attached at one end eccentrically to said disk, a second shaft having a radial arm, the second end of the connecting rod being pivotally attached to said arm and adapted to oscillate the second shaft, a threading shaft carrying a tap, and a drive means between the oscillating shaft and the threading shaft by means of which the threading shaft will be rotated a predetermined number of revolutions in one direction on a swing of the arm in one direction, and a similar number of revolutions in an opposite direction on the return swing of said arm, and means by which the attachment of the connecting rod to the disk and to the arm may be shifted to determine the number of revolutions which the threading shaft will rotate on the swing of the arm.

3. A threading device of the character described, a base, a gear-reduction box mounted on the same, said gear-reduction box including a slow-speed output shaft, a disk concentrically secured on the shaft, a connecting rod eccentrically attached to the disk, means by which the point of connection of the connecting rod may be shifted to or from the center of the disk, the opposite end of the connecting rod being pivotally attached to an arm, a shaft from which said arm radially projects whereby said shaft is oscillated by rotation of the first shaft, means by which the end of the connecting rod may be secured in any one of several positions on said arm toward or away from the shaft on which the arm is secured, a large gear on the shaft on which the arm is carried, a threading shaft provided with a chuck, a tap carried in said chuck, and gearing carried on the threading shaft and driven from the large gear at a greater number of revolutions than the large gear, whereby the threading shaft will be rotated a certain number of revolutions in one direction, and then the same number of revolutions in the opposite direction.

4. In a threading apparatus of the character described, a drive shaft, an oscillating shaft, a threading shaft, an intermediate shaft located between the oscillating and threading shafts all of said shafts being substantially parallel, the drive shaft carrying a disk, the oscillating shaft carrying an arm, a connecting rod extending between the disk and arm, said connecting rod being connected eccentrically to the disk, the oscillating shaft carrying a large gear, the intermediate shaft carrying a pinion in mesh with the large gear, the intermediate shaft also carrying a gear larger than the pinion, the threading shaft carrying a pinion smaller than, and in mesh with, the gear on the intermediate shaft, and the threading shaft also carrying a tap.

GEORGE I. ZEICHNER.